US012459108B2

(12) United States Patent
Sarkisian et al.

(10) Patent No.: US 12,459,108 B2
(45) Date of Patent: Nov. 4, 2025

(54) POWERED ANKLE EXOSKELETON WITH SERIES-ELASTIC ACTUATION

(71) Applicant: University of Utah Research Foundation, Salt Lake City, UT (US)

(72) Inventors: Sergei V. Sarkisian, Salt Lake City, UT (US); Tommaso Lenzi, Salt Lake City, UT (US); Lukas R. Gabert, Salt Lake City, UT (US); Brendon M. Ortolano, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 18/646,639

(22) Filed: Apr. 25, 2024

(65) Prior Publication Data

US 2024/0359313 A1 Oct. 31, 2024

Related U.S. Application Data

(60) Provisional application No. 63/462,843, filed on Apr. 28, 2023.

(51) Int. Cl.
*B25J 9/00* (2006.01)
*A61H 1/02* (2006.01)
*A61H 3/00* (2006.01)

(52) U.S. Cl.
CPC .......... *B25J 9/0006* (2013.01); *A61H 1/0266* (2013.01); *A61H 3/00* (2013.01)

(58) Field of Classification Search
CPC ........ B25J 9/0006; A61H 1/0266; A61H 3/00; A61H 2201/12–123; A61H 2201/1436; A61H 2201/149
See application file for complete search history.

(56) References Cited

U.S. PATENT DOCUMENTS 10,959,872 B2 3/2021 Choi et al.
11,304,827 B2 4/2022 Mooney et al.
(Continued)

FOREIGN PATENT DOCUMENTS

CN 110292507 A 10/2019
CN 111202657 A * 5/2020
CN 113081701 B 3/2022
CN 113397919 B 4/2022
(Continued)

OTHER PUBLICATIONS

CN-111202657-A machine translation accessed Jul. 23, 2024 (Year: 2020).*
(Continued)

*Primary Examiner* — Timothy A Stanis
*Assistant Examiner* — Kira B Daher
(74) *Attorney, Agent, or Firm* — Workman Nydegger

(57) ABSTRACT

Disclosed is a lightweight powered ankle exoskeleton with integrated series-elastic actuation capable of providing high torque and power densities while maintaining a compact and lightweight profile. The exoskeleton includes: a frame configured to be worn adjacent a lower leg of a user; a power transmission assembly integrated with the frame and configured to deliver torque to a crank member to rotate the crank member about an ankle joint; and a foot/shoe interface coupled to the crank member and configured to interface with a foot or shoe of the user and to transmit torque generated at the ankle joint to the foot or shoe of the user.

20 Claims, 8 Drawing Sheets

(56) References Cited

U.S. PATENT DOCUMENTS

| | | | | |
|---|---|---|---|---|
| 2010/0152630 | A1* | 6/2010 | Matsuoka | A61H 3/008 601/35 |
| 2012/0259429 | A1* | 10/2012 | Han | A61F 5/0127 623/24 |
| 2014/0330431 | A1* | 11/2014 | Hollander | A61H 3/00 29/428 |
| 2016/0023350 | A1* | 1/2016 | Holgate | B25J 9/0006 901/1 |
| 2016/0113831 | A1* | 4/2016 | Hollander | A61H 3/00 623/32 |
| 2018/0116828 | A1* | 5/2018 | Quinn | B25J 9/0006 |
| 2019/0298599 | A1* | 10/2019 | Mooney | A61H 1/0237 |
| 2020/0016020 | A1* | 1/2020 | Mooney | A61B 5/1071 |
| 2021/0015637 | A1 | 1/2021 | Sun | |
| 2021/0315766 | A1 | 10/2021 | Kurauchi | |
| 2022/0395417 | A1 | 12/2022 | Mooney et al. | |
| 2023/0007984 | A1* | 1/2023 | Sarkisian | A61F 5/0123 |
| 2024/0099923 | A1* | 3/2024 | Lee | A61H 1/0244 |

FOREIGN PATENT DOCUMENTS

| | | | | |
|---|---|---|---|---|
| RU | 2729732 | C1 * | 8/2020 | A61H 3/00 |
| WO | 2016/180073 | A1 | 11/2016 | |
| WO | WO-2018090047 | A1 * | 5/2018 | A61B 5/1116 |
| WO | 2020/018035 | A2 | 1/2020 | |
| WO | 2023/287960 | A1 | 1/2023 | |

OTHER PUBLICATIONS

RU_2729732_C1 description (Year: 2020).*

Browning RC, Modica JR, Kram R, Goswami A. The effects of adding mass to the legs on the energetics and biomechanics of walking. Med Sci Sports Exerc. Mar. 2007;39(3):515-25. doi: 10.1249/mss.0b013e31802b3562. PMID: 17473778.

Meijneke et al., "Achilles: An Autonomous Lightweight Ankle Exoskeleton to Provide Push-Off Power", 2014 5th IEEE RAS & EMBS International Conference on Biomedical Robotics and Biomechatronics (BioRob), Aug. 2014, pp. 918-923.

* cited by examiner

POWERED ANKLE EXOSKELETON WITH SERIES-ELASTIC ACTUATION

CROSS-REFERENCE TO RELATED APPLICATIONS

This application claims priority to and the benefit of U.S. Provisional Patent Application No. 63/462,843, filed Apr. 28, 2023 and titled "Powered Ankle Exoskeleton with Series-Elastic Actuation," the entirety of which is incorporated herein by reference.

STATEMENT REGARDING FEDERALLY SPONSORED RESEARCH

This invention was made with government support under 2046287 awarded by the National Science Foundation. The government has certain rights in the invention.

BACKGROUND

Powered exoskeletons are a rapidly evolving technology with the potential to greatly enhance human capabilities. Exoskeletons include an external framework that is worn by the user and an electromechanical actuator that provides torque at the joint level. The exoskeleton torque can augment the movements of the user as needed for rehabilitation and physical therapy, for military and industrial use, or assistance in everyday life. Substantial effort is currently spent researching and developing powered exoskeletons that can operate in the real world.

A fundamental challenge limiting the real-world usability of powered exoskeletons, especially lower-limb exoskeletons, is that adding mass to the body increases the metabolic effort needed to walk. Specifically, walking metabolic effort increases proportionally to the exoskeleton mass. Moreover, mass added distally to the user's body center of mass has a much greater negative effect than mass added proximally, so adding mass at the ankle/foot is four times more costly than at the trunk (See Browning et al. "The effects of adding mass to the legs on the energetics and biomechanics of walking," *Med Sci Sports Exerc*, vol. 39, no. 3, pp. 515-525, 2007). Therefore, the negative effect of added distal mass poses a particularly difficult design challenge for powered ankle exoskeletons, due to the distal location of the assisted joint.

To mitigate the negative effect of the exoskeleton mass on the user's metabolic effort, researchers have proposed designs that attempt to minimize the exoskeleton mass worn at the user's leg. For example, batteries and control electronics are commonly placed in external boxes worn above the waist. In a few cases, the whole actuation system, including the electrical motors, is remotely located at the waist/trunk level. Unfortunately, this approach requires wearing a pack and having long wires and/or cables running down the user's leg(s). Thus, while moving part of the exoskeleton mass to the trunk/back can decrease the negative effect of the exoskeleton mass, it limits practical, real-world usability.

Minimizing the actuation weight is another approach to decreasing the negative effect of the exoskeleton mass. Some exoskeletons attempt to minimize the exoskeleton mass using cable-driven actuators. Cables are generally lightweight and allow for a high range of motion. However, they can only transmit power in one direction via tension. Therefore, two actuators are needed to achieve bidirectional actuation with cable systems. Additionally, cables (especially Bowden cable systems) suffer from poor mechanical efficiency and limited durability, which are essential for real-world exoskeleton use. Some researchers have proposed using a hydraulic piston-cylinder system and pneumatic actuators powered by a portable $CO_2$ tank. However, such exoskeletons are not lighter than conventional systems using electromechanical actuators.

Accordingly, minimizing exoskeleton mass without negatively affecting output power and efficiency remains an ongoing challenge.

SUMMARY

Disclosed herein is a lightweight powered ankle exoskeleton with integrated series-elastic actuation capable of providing high torque and power densities while maintaining a compact and lightweight profile. The device includes lightweight self-aligning mechanisms in the form of one or more pDOFs to provide secure yet comfortable fit to the user. For example, the pDOFs can beneficially provide self-alignment of the device to the user's anatomy, can account for anatomical differences across different users, can provide the user greater freedom of movement, and can increase user comfort while using the device.

In one embodiment, a powered ankle exoskeleton comprises: a frame configured to be worn adjacent a lower leg of a user; a power transmission assembly integrated with the frame and configured to deliver torque to a crank member to rotate the crank member about an ankle joint; and a foot/shoe interface coupled to the crank member and configured to interface with a foot or shoe of the user and to transmit torque generated at the ankle joint to the foot or shoe of the user. The power transmission assembly comprises a slider-crank configuration with series-elastic actuation.

The power transmission assembly can include: a motor and a power screw (e.g., a ball screw) mechanically coupled to the motor. The motor drives rotation of a shaft of the power screw which drives linear motion of a nut assembly of the power screw. The linear motion of the nut assembly defines a linear axis. A first end of a spring is coupled to the nut assembly and a second end of the spring is coupled to an end-effector. The end-effector is configured to move along the linear axis to drive rotation of the crank member via a coupler.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

Various objects, features, characteristics, and advantages of the disclosure will become apparent and more readily appreciated from the following description, taken in conjunction with the accompanying drawings and the appended claims, all of which form a part of this specification. In the Drawings, like reference numerals may be utilized to designate corresponding or similar parts in the various Figures, and the various elements depicted are not necessarily drawn to scale, wherein:

DETAILED DESCRIPTION

Overview

Disclosed herein is a lightweight powered ankle exoskeleton with integrated series-elastic actuation, batteries, and electronics. The disclosed powered ankle exoskeleton includes features that enable high torque and power densities. The device includes a lightweight, high-torque series elastic actuator integrated into an exoskeleton frame, with further integration of batteries, electronics, and lightweight self-aligning mechanisms to provide a comfortable fit to the user.

The power transmission assembly and actuation kinematics of the disclosed powered ankle exoskeleton provide a convenient, self-contained design that does not require an external power source such as external batteries, external cable-driving systems (for cable-based designs), or external compressed air (for pneumatic actuator designs). Additional benefits are discussed below and include a device with high torque and power density, pDOFs to keep the device firmly but comfortably positioned against the lower leg, and a power transmission assembly that provides effective series-elastic actuation with a single spring in a simple, compact design.

The simple and effective design of the powered ankle exoskeleton beneficially provides high torque and power density while maintaining a compact and lightweight profile. For example, the overall mass of the device can be 1.3 kg or less, with the specific embodiment illustrated herein weighing about 1.24 kg.

Figure 1:
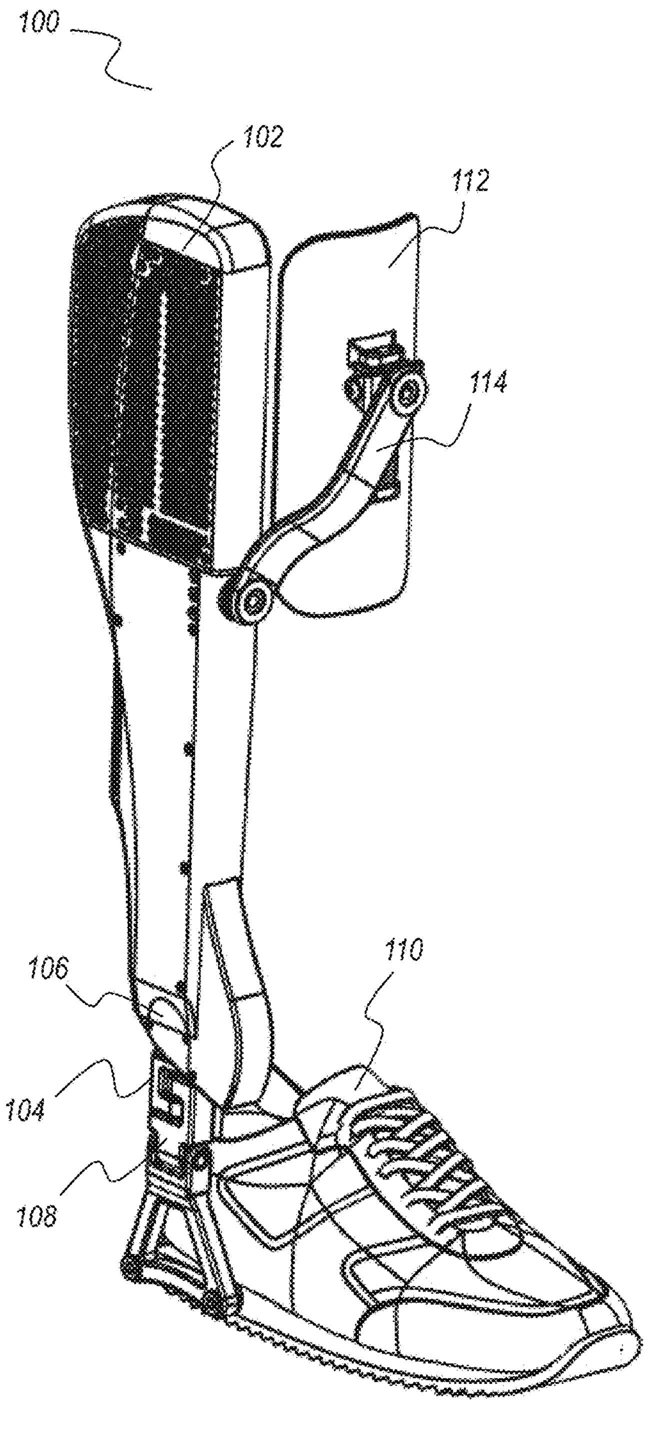
FIG. 1 illustrates an example of a powered ankle exoskeleton comprising a frame with which a power transmission assembly is integrated and a foot/shoe interface to interface with the foot or shoe of the user.

FIG. 1 illustrates an example of the powered ankle exoskeleton 100. The powered ankle exoskeleton 100 includes a frame 102 that is configured to be worn adjacent a lower leg of the user (not shown). For example, the frame 102 can be configured to be worn adjacent the medial or lateral side of the lower leg of the user. Examples illustrated herein show the frame 102 positioned on the lateral side of the lower leg of the user. A power transmission assembly is integrated with the frame 102 and is configured to deliver torque to a crank member 104 to rotate the crank member 104 about an ankle joint 106.

The power transmission assembly comprises a slider-crank configuration with series-elastic actuation. For example, the power transmission assembly can include an offset slider-crank four-bar linkage kinematic configuration with series-elastic actuation provided by a spring integrated with the linear actuator portion of the assembly. In an offset configuration, the ankle joint is not aligned with the linear axis defined by the slider's movement.

A foot/shoe interface 108 is coupled to the crank member 104. The foot/shoe interface 108 is configured to interface with a foot or shoe of the user (such as illustrated shoe 110) and to transmit the torque generated at the ankle joint 106 to the foot or shoe of the user.

As shown, the foot/shoe interface 108 can attach to a heel portion of the shoe 110 (or other footwear). In other embodiments, the foot/shoe interface 108 can additionally or alternatively attach to other portions of the foot or shoe of the user. Although most applications will involve attachment to a shoe 110 rather than direct engagement with the user's foot, some embodiments may include features that are comfortable enough to engage with the user's foot without necessarily requiring shoes. For example, the foot/shoe interface 108 may include a strap, band, wrap, pad, and/or other structure(s) to engage appropriately with the user's foot. As described in more detail below, the foot/shoe interface 108 can be configured with one or more passive degrees of freedom to enable free movement of the foot/shoe of the user relative to the ankle joint 106.

The powered ankle exoskeleton 100 also includes a shin cuff 112 configured to be positioned on an anterior or posterior side of the lower leg, most typically on the anterior side such as illustrated. The shin cuff 112 can be coupled to the frame 102 via a link member 114. The shin cuff 112 and link member 114 can also provide one or more passive degrees of freedom to enable movement of the frame 102 relative to the shin cuff 112, as discussed in more detail below.

Power Transmission Assembly

Figure 2A:
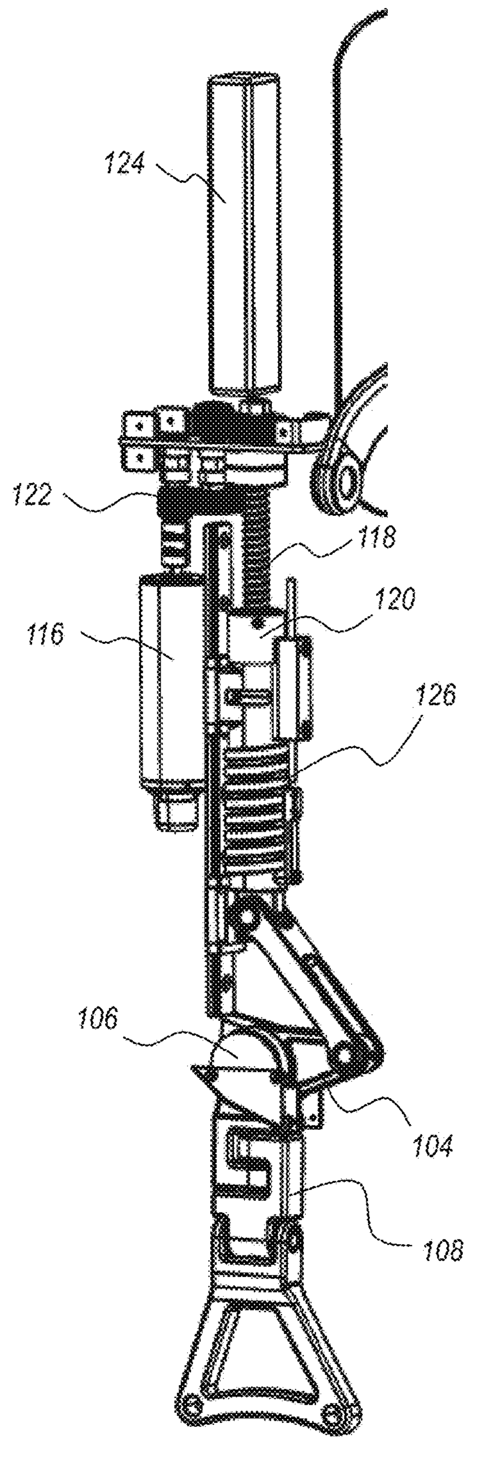
FIG. 2A is another view of the powered ankle exoskeleton with the frame and shoe removed to illustrate components of the power transmission assembly.

FIG. 2A is another view of the powered ankle exoskeleton 100 with the frame 102 and shoe 110 removed to illustrate components of the power transmission assembly that are typically housed or covered by the frame 102. The power transmission assembly includes a motor 116 that is mechanically coupled to a power screw. Operation of the motor 116 drives rotation of a shaft 118 of the power screw, which drives linear motion of a nut assembly 120 of the power screw. The power screw is preferably configured as a ball screw, which is a type of power screw where the nut assembly 120 includes ball bearings that roll along the threads of the shaft 118, causing the nut assembly 120 to move linearly along the shaft. The linear motion of the nut assembly defines a linear axis. As described in greater detail below, the linear motion of the power screw is translated to rotational motion of the crank member 104 about the ankle joint 106.

As shown, the motor 116 can be oriented with its rotational axis substantially parallel to the linear axis defined by the power screw. Although other motor orientations can be utilized, a parallel orientation typically better matches the allowed space of the frame 102, which is informed by the general shape of the lower leg. A gear assembly 122 can transmit the motor shaft rotation to the shaft 118 of the power screw. Any suitable gear assembly can be utilized to achieve a desired gear ratio, and the gear assembly 122 can vary based on application needs, individual preferences, and/or according to specifications of the motor 116.

The power transmission assembly can also include a power source, such as battery 124. In some embodiments, the linear series-elastic design can be operated in a way that captures a portion of the motion of the actuation system to recharge the battery 124. The power source is used to power the motor 116, the controller (not shown) and its associated electronics, and a set of sensors used to measure, for example, position and orientation of the ankle joint 106, deflection of spring 126, and position and velocity of the motor 116.

Figure 2B:
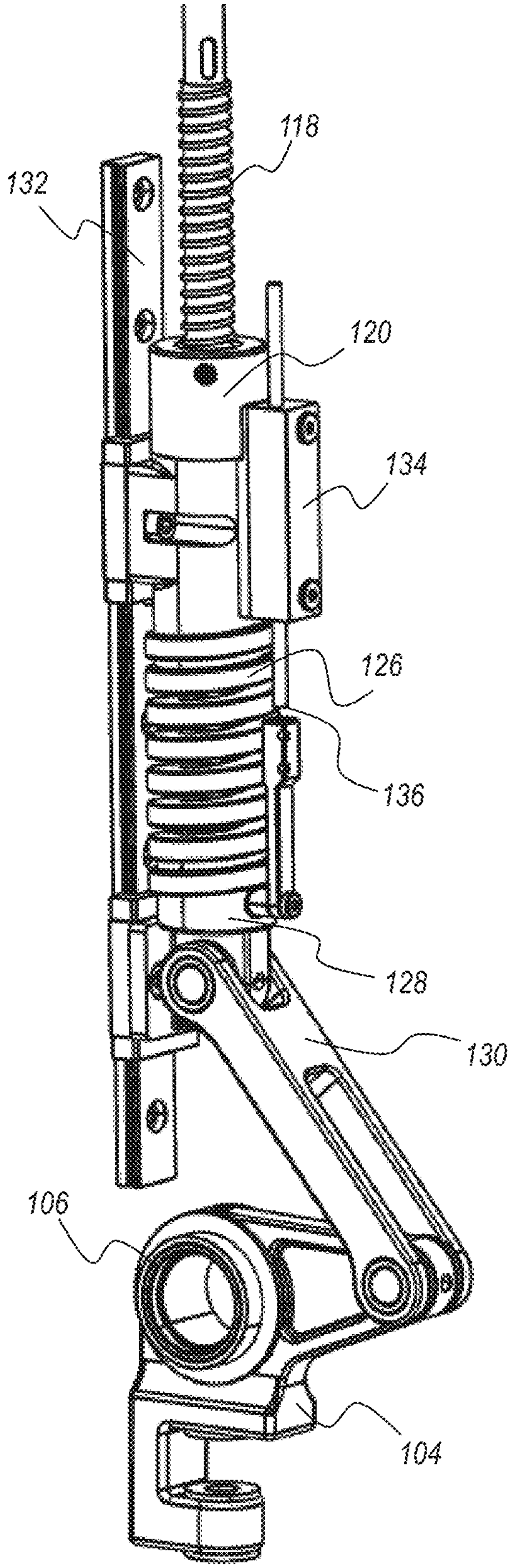
FIG. 2B is a more detailed view of the distal elements of the drivetrain of the powered ankle exoskeleton.

FIG. 2B provides a more detailed view of the distal elements of the drivetrain. As shown, a first end of the spring 126 is coupled to the nut assembly 120 and a second end of the spring 126 is coupled to an end-effector 128. The end-effector 128, like the nut assembly 120, is configured to move along the linear axis and to drive rotation of the crank member 104 via a coupler 130. The coupler 130 includes a first end coupled to the end-effector 128 via a revolute joint and a second end coupled to an arm of the crank member 104 via a revolute joint. The coupler translates linear motion of the end-effector 128 to rotation of the crank member 104 about the ankle joint 106.

The nut assembly 120 and the end-effector 128 are slidably connected to a guide rail 132 that is configured to maintain movement of the nut assembly 120 and end-effector 128 along the linear axis.

The powered ankle exoskeleton 100 can also include a spring deflection sensor. For example, the illustrated embodiment includes a linear potentiometer positioned with potentiometer 134 and shaft 136 on opposite sides of the spring 126. That is, the potentiometer 134 can be fixed to the nut side of the spring 126, while the shaft 136 of the sensor can be connected to the end-effector side of the spring 126. These positions can be reversed in other embodiments. Additional or alternative linear displacement sensors, such as known in the art, may be included.

Figure 2C:
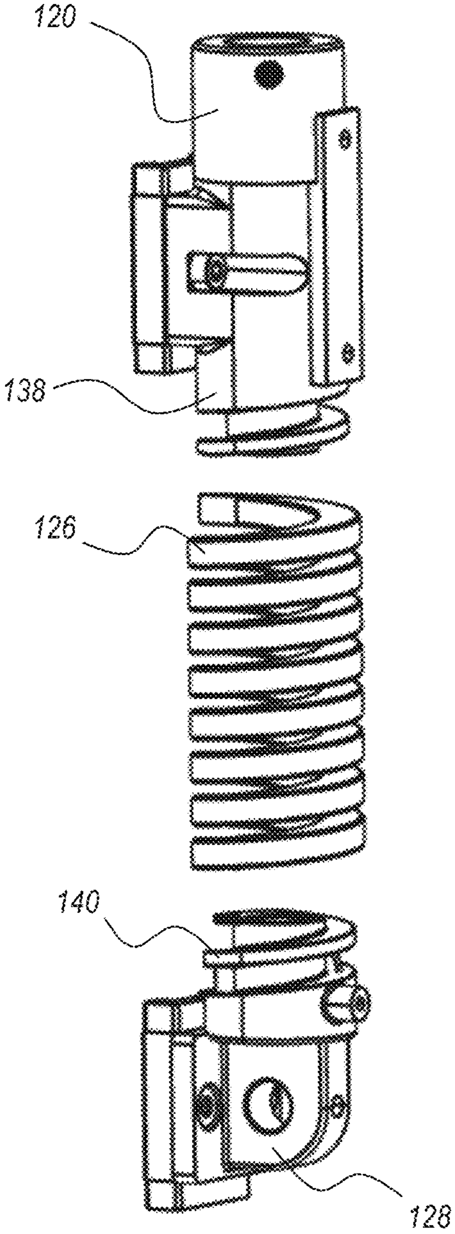
FIG. 2C is an exploded view of the nut assembly, spring, and end-effector of the drivetrain to illustrate an example means of attaching these components via threaded components that match the diameter and pitch of the spring.

FIG. 2C is an exploded view of the nut assembly 120, spring 126, and end-effector 128 to illustrate an example means of attaching these components. The nut assembly 120 can include a connector portion 138 to couple to the first end of the spring 126. The connector portion 138 includes threads that match a pitch and diameter of the spring 126. This allows the first end of the spring 126 to be threaded onto the connector portion 138 to effectively couple the spring 126 to the nut assembly 120. Similarly, the end-effector 128 can comprise a threaded connector portion 140 to effectively couple to the second end of the spring 126 by threading the second end of the spring 126 onto the matching threads of the connector portion 140.

In the illustrated powered ankle exoskeleton 100, the spring 126 is the only spring in the power transmission assembly and is configured to provide both tension and compression along the linear axis. This enables a simple, compact design relative to other designs that utilize multiple springs. The powered ankle exoskeleton 100 does not, for example, require separate springs for tension and compression effects from the series-elastic element.

Figure 3A:
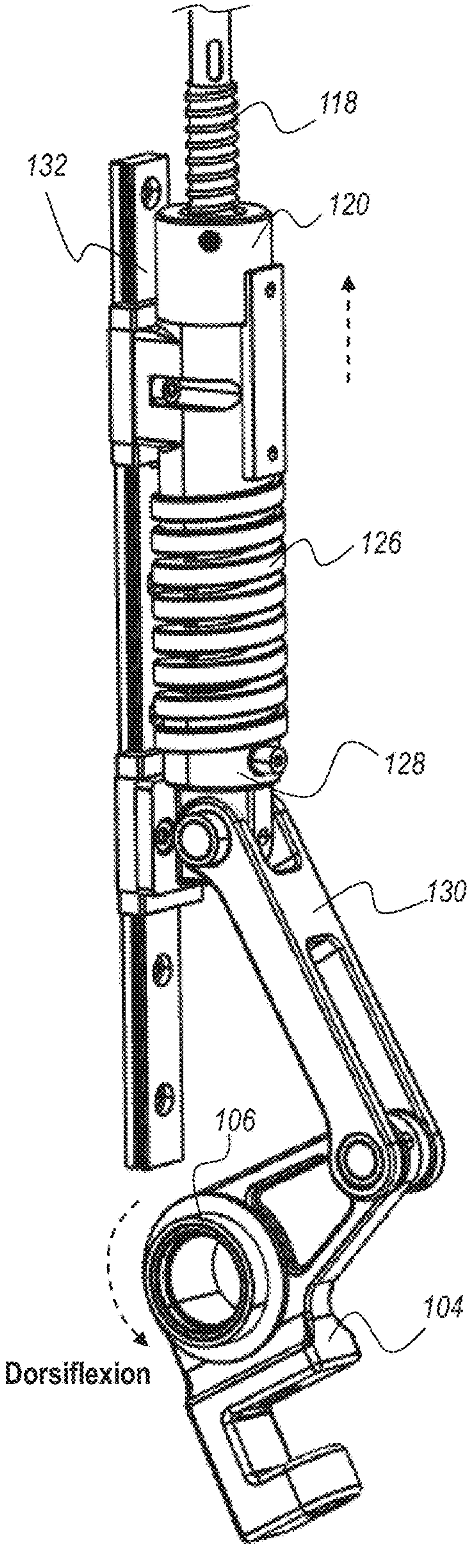
FIGS. 3A and 3B illustrate how linear motion of the nut assembly and end-effector translate to torque and rotational motion at the ankle joint.
Figure 3B:
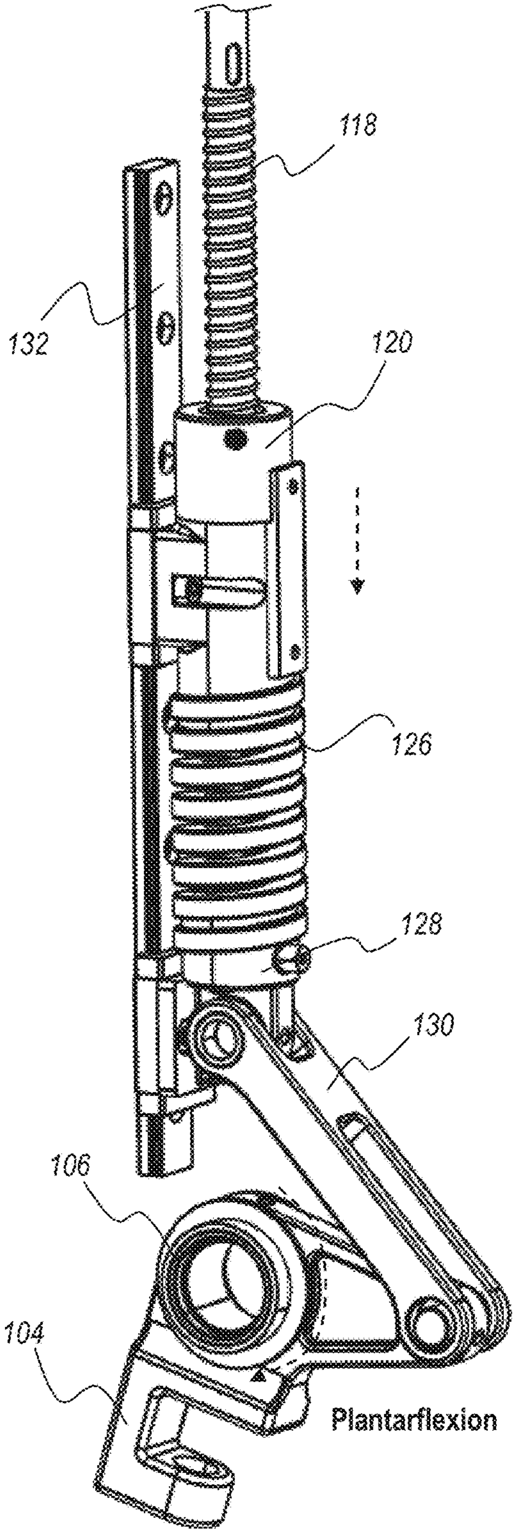

FIGS. 3A and 3B illustrate how linear motion of the nut assembly 120 and end-effector 128 translate to torque and rotational motion at the ankle joint 106. The frame 102, shoe 110, and certain other components are removed for purposes of illustration. In FIG. 3A, rotation of shaft 118 drives upward linear motion of the nut assembly 120, which puts spring 126 under tension. The tension of spring 126 subsequently moves the end-effector 128 upward, which moves coupler 130 and thereby causes crank member 104 to rotate upward in a dorsiflexion motion.

In contrast, as show in FIG. 3B, opposite rotation of shaft 118 drives downward linear motion of the nut assembly 120, which puts spring 126 under compression. The compression of spring 126 then moves the end-effector 128 downward, which moves coupler 130 and thereby causes crank member 104 to rotate downward in a plantarflexion motion.

Passive Degrees of Freedom

Figure 4A:
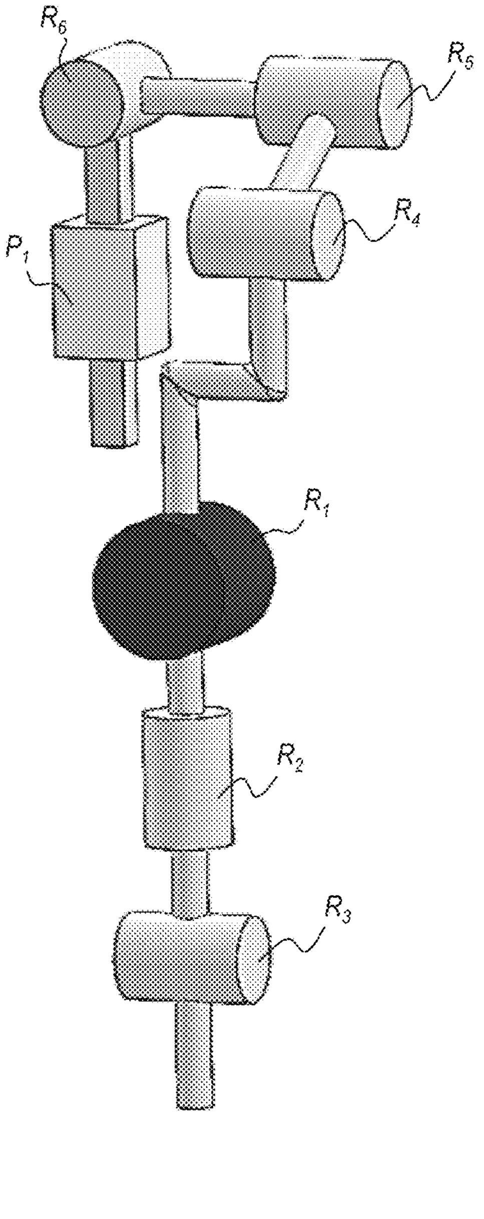
FIGS. 4A and 4B illustrate example passive degrees of freedom (pDOFs) that can be incorporated into the powered ankle exoskeleton.
Figure 4B:
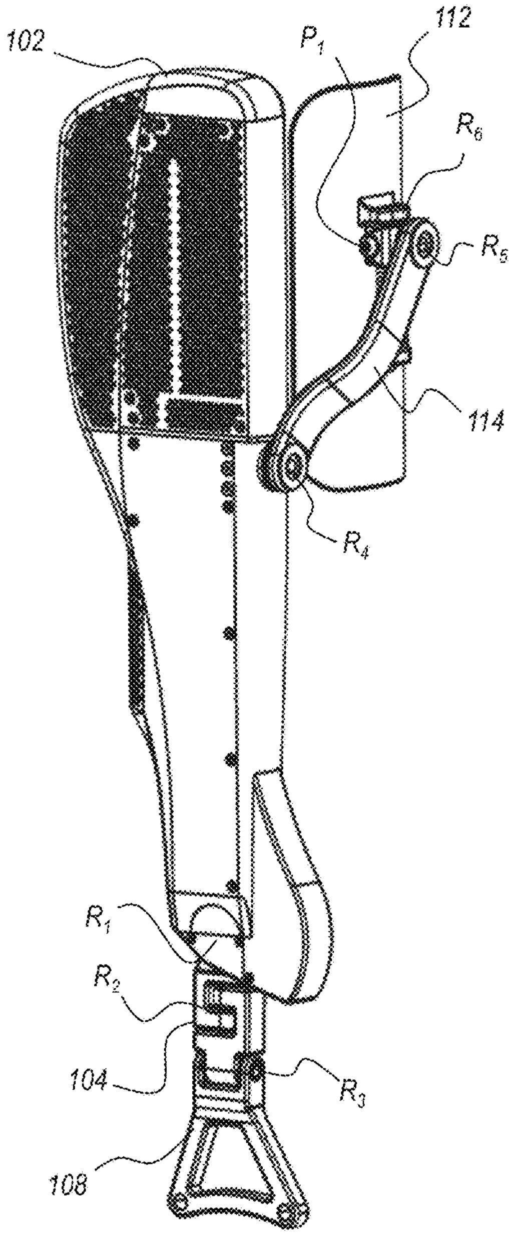

FIGS. 4A and 4B illustrate example pDOFs that can be incorporated into the powered ankle exoskeleton 100, with FIG. 4A illustrating the pDOFs in schematic fashion and FIG. 4B showing the locations of the corresponding pDOFs on the powered ankle exoskeleton 100. The pDOFs can beneficially provide self-alignment of the device to the user's anatomy, can account for anatomical differences across different users, can provide the user greater freedom of movement, and can increase user comfort while using the device, for example.

In FIGS. 4A and 4B, revolute joint R1 corresponds to ankle joint 106. Revolute joint R2 allows for relative rotation of the foot/shoe interface 108 and crank member 104 about the vertical axis (i.e., allows for foot abduction and adduction). Revolute joint R3 allows for relative rotation of the foot/shoe interface 108 and crank member 104 about an anterior/posterior axis (i.e., allows for foot eversion and inversion). Revolute joints R4 and R5 correspond to the connections of the link member 114 to the frame 102 and shin cuff 112, respectively. R4 and R5 allow relative rotation of the frame 102 and shin cuff 112 about anterior/posterior axes. Revolute joint R6 allows relative rotation of the frame 102 and shin cuff 112 about a medial/lateral axis. Prismatic joint P1 provides for relative vertical motion of the frame 102 and the shin cuff 112.

Figure 5A:
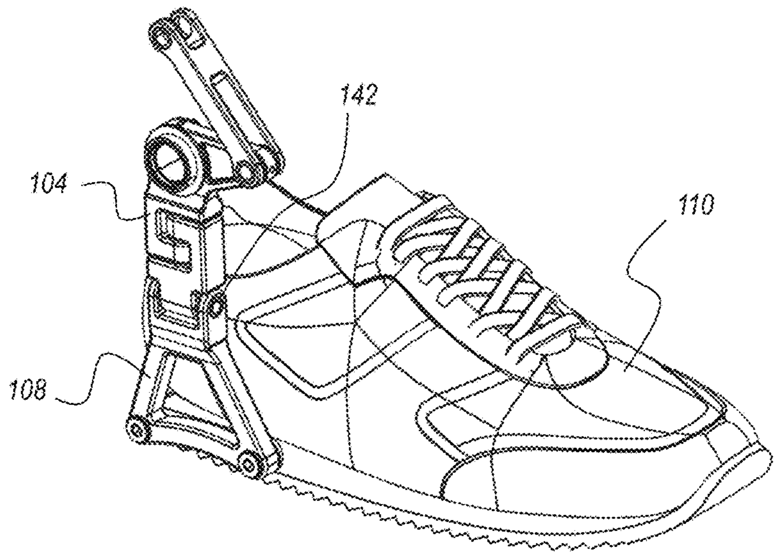
FIGS. 5A-5E are detailed views of the pDOFs associated with the crank member and the foot/shoe interface.
Figure 5B:
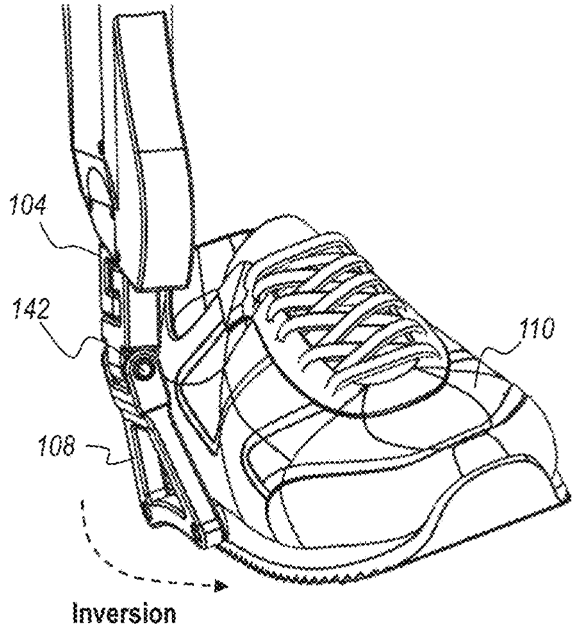
Figure 5C:
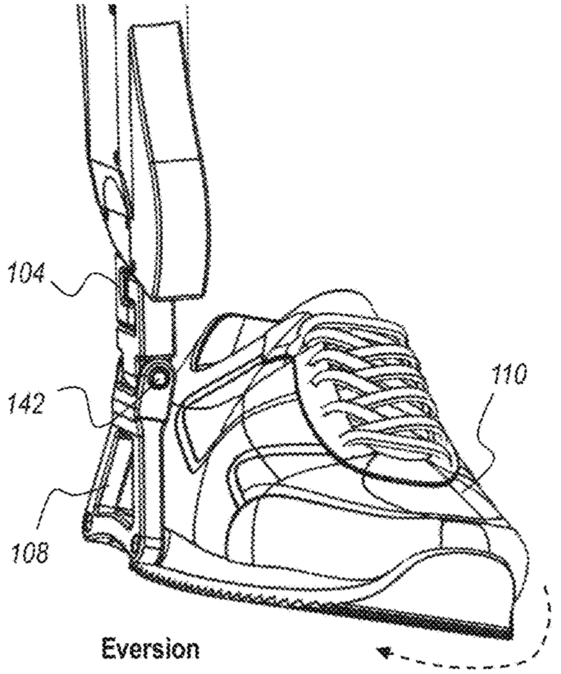

FIGS. 5A-5E are detailed views of the pDOFs associated with the crank member 104 and the foot/shoe interface 108. FIG. 5A shows the shoe 110 and the foot/shoe interface 108 in a neutral position. FIG. 5B shows that the foot/shoe interface 108 includes a hinge joint 142 (corresponding to R3 in FIGS. 4A and 4B) that allows inversion of the shoe 110 relative to the crank member 104. FIG. 5C shows that joint 142 also allows eversion of the shoe 110 relative to the crank member 104.

Figure 5D:
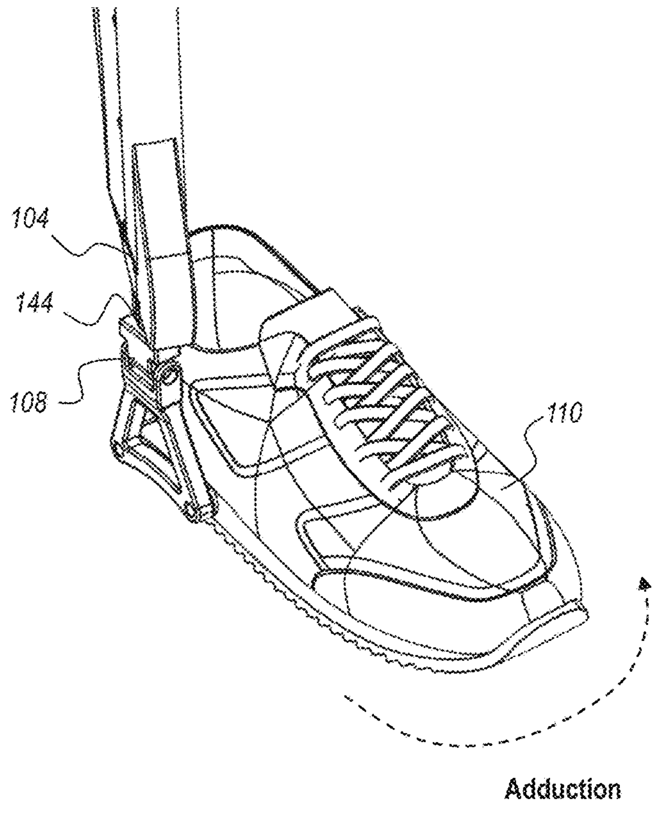
Figure 5E:
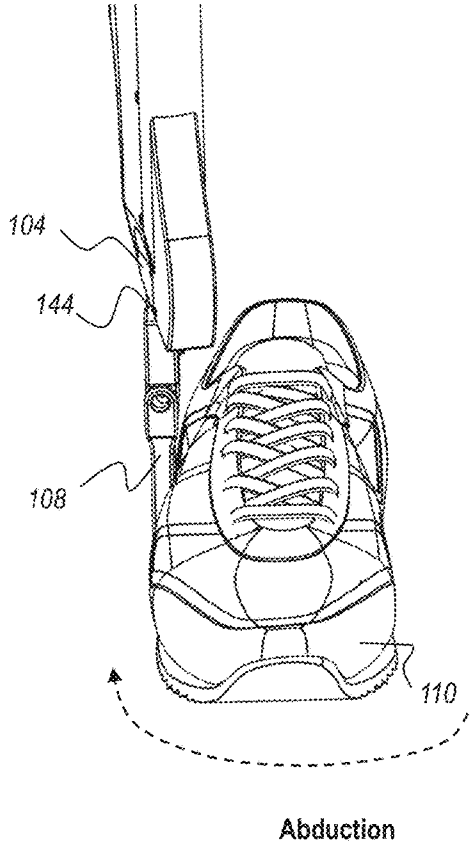

FIGS. 5D and 5E show that the foot/shoe interface 108 includes a hinge joint 144 (corresponding to R2 in FIGS. 4A and 4B) that allows for internal rotation (adduction) of the shoe 110 relative to the crank member 104 (FIG. 5D) and external rotation (abduction) of the shoe 110 relative to the crank member 104 (FIG. 5E).

Figure 6A:
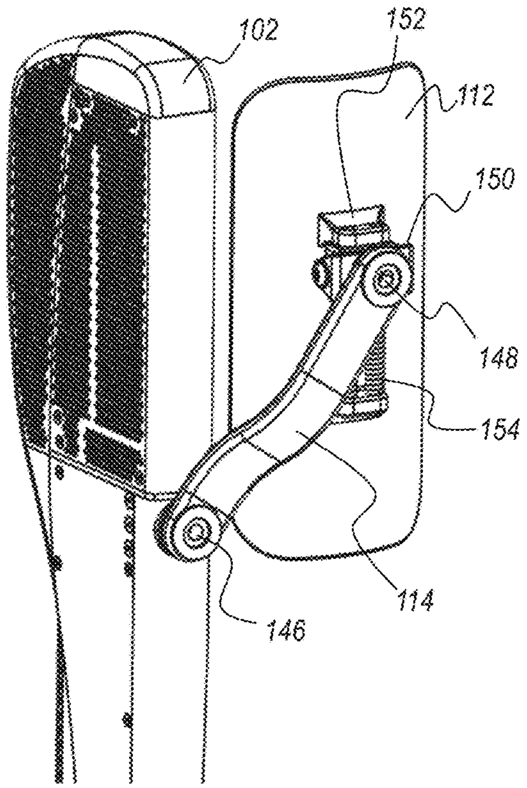
FIGS. 6A-6C are detailed views of the pDOFs associated with the frame, shin cuff, and link member.
Figure 6B:
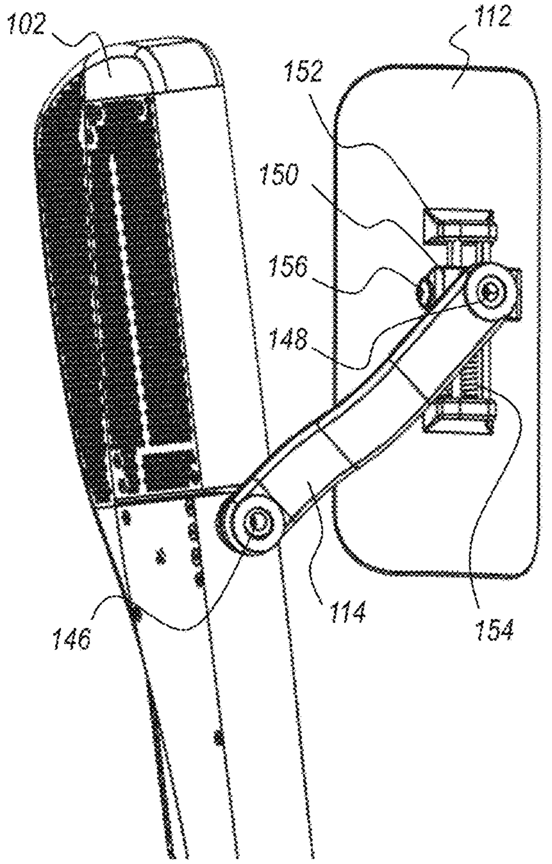
Figure 6C:
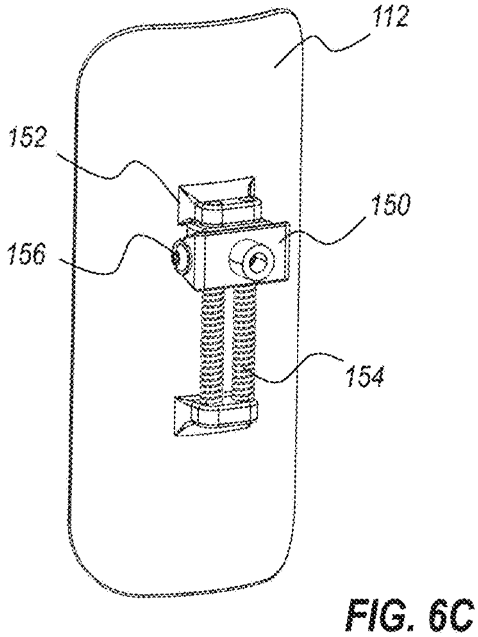

FIGS. 6A-6C are detailed views of the pDOFs associated with the frame 102, shin cuff 112, and link member 114. The link member 114 joins the frame 102 and shin cuff 112 at revolute joints 146 and 148 (corresponding to R4 and R5 in FIGS. 4A and 4B). The link member connections thus allow relative movement of the frame 102 and the shin cuff 112 about axes that are parallel to an anterior/posterior direction. This allows, for example, the frame 102 to be pivoted out and away from the shin cuff 112 and/or allows for the frame 102 to orient at an angle that best matches the angle of the user's lower leg (e.g., which may be wider close to the knee and taper to a smaller width closer to the foot).

The shin cuff 112 can also include a connector 150 to which the link member 114 attaches. The connector 150 can be configured as a slider slidably connected to corresponding guide 152 that enable vertical movement of the frame 102 relative to the shin cuff 112. FIG. 6B shows the connector 150 moved downward. Because joint 148 of the link member 114 is connected to the connector 150, this allows the relative vertical movement of the frame 102 and shin cuff 112.

One or more biasing elements (e.g., one or more springs 154) can also be included to bias the connector 150 toward a default position upon the guide 152. In the illustrated embodiment, a set of springs 154 bias the connector 150 upward, which tends to rotate the link member 114 and bring the frame 102 closer to the shin cuff 112 in the absence of a counteracting force. That is, the shin cuff 112 tends to pull the frame 102 inward to maintain snug contact and fit against the user's leg, but also allows for deflection to accommodate user movements and adjustments.

The connector 150 can additionally or alternatively be configured to rotate about joint 156. Joint 156 enables relative rotation of the frame and the shin cuff along an axis parallel to a medial/lateral direction. FIG. 6C illustrates the connector 150 and guide 152 with the link member 114 removed for better illustration.

The combination of (1) vertical displacement via connector 150, (2) rotation about joints 146 and 148 of link member 114, and (3) rotation about joint 156 of connector 150 provides a versatile range of relative movement that enables comfortable and mobile yet secure attachment to the user's lower leg.

Example Controller & Electronics Features

The powered ankle exoskeleton 100 can include various sensors to provide information and feedback to the controller. For example, the powered ankle exoskeleton 100 can include a joint position sensor (e.g., magnetic encoder) for measuring the position of the ankle joint 106, a joint orientation sensor for measuring the orientation of the ankle joint 106, a spring deflection sensor (e.g., the linear potentiometer disclosed herein), a motor position/velocity sensor (e.g., a magnetic rotary encoder), and other such sensors as are known in the art.

Figure 7:
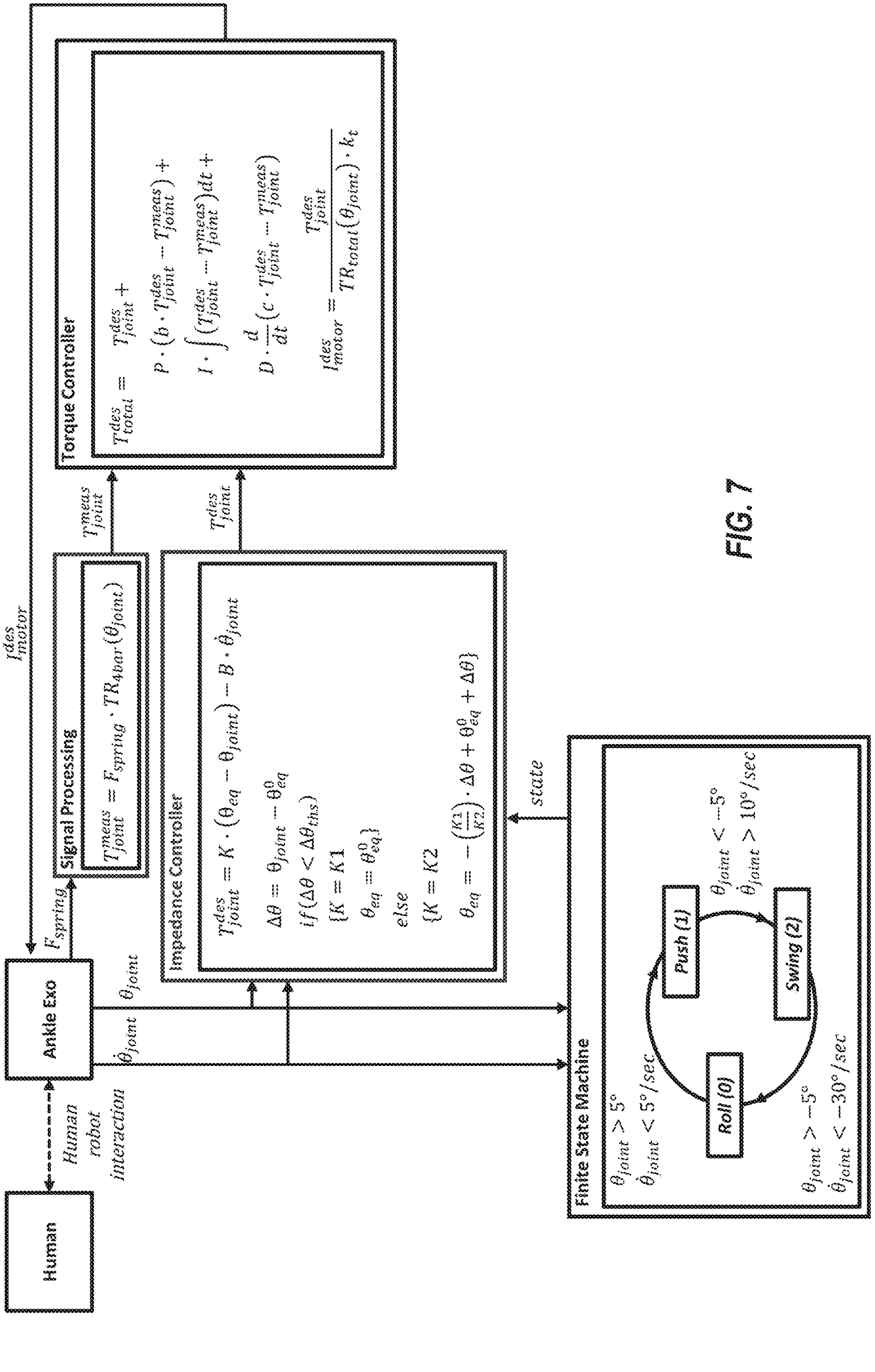
FIG. 7 is a schematic illustration of an example controller configuration.

FIG. 7 schematically illustrates an example controller configuration. For the low-level torque controller, the spring 126 can be utilized as a torque-sensing element. Using the linear potentiometer to measure the deflection of the spring 126, the force acting on the spring 126 and ball screw ($F_{spring}$) can be determined by multiplying the deflection of the spring 26 by its stiffness. The force acting on the ball screw can then be multiplied by the transmission ratio of the four-bar mechanism ($TR_{4\ bar}$), to estimate the torque at the output joint angle ($T_{joint}^{meas}$), as shown in equation (1):

$$T_{joint}^{meas} = F_{spring} \cdot TR_{4\ bar}(\theta_{joint}) \tag{1}$$

The difference between the desired torque ($T_{joint}^{des}$) and the measured torque ($T_{joint}^{meas}$) provides the input for a PID regulator. The output of the PID regulator is added to a feedforward term ($T_{joint}^{des}$) to determine the total desired joint torque $T_{total}^{des}$, as shown in equation (2):

$$T_{total}^{des} = \eta T_{joint}^{des} + P \cdot \left(T_{joint}^{des} - T_{joint}^{meas}\right) + I \cdot \frac{1}{s}\left(T_{joint}^{des} - T_{joint}^{meas}\right) + D \cdot s\left(T_{joint}^{des} - T_{joint}^{meas}\right) \tag{2}$$

The terms P, I, and D are the proportional, integral, and derivative gains, respectively. The values used for these gains can be determined through experimental tuning. Example values determined to be effective are P=1.5, 1=1, and D=0.133. η is an efficiency term. The total desired joint torque is divided by the total transmission ratio ($TR_{total}$) and a motor torque constant ($k_t$) to obtain the desired motor current ($I_{motor}^{des}$), which is sent to the motor driver as shown in equation (3):

$$I_{motor}^{des} = \frac{T_{joint}^{des}}{TR_{total} \cdot k_t} \tag{3}$$

For the high-level impedance controller, this example embodiment uses a finite-state machine that separates the gait cycle into three distinct states: Roll(0), Push(1), and Swing(2), as shown in FIG. 7. The gait cycle starts at heel strike with the state Roll. Roll lasts while the foot is on the ground and the user is dorsiflexing. As the user begins to plantarflex his/her ankle, the finite state machine transitions to Push. The transition from Roll to Push occurs when the ankle joint position is greater than 5° and the ankle joint velocity is greater than 5°/s. From Push, the finite-state machine transitions to Swing when the ankle joint angle is less than −5° and the ankle joint velocity is greater than 10°/s. Finally, the transition from Swing to Roll occurs at approximately heel-strike when the ankle joint position is greater than −5° and ankle joint velocity is less than −30°/s.

The desired joint torque ($T_{joint}^{des}$) is determined by an impedance controller using the stiffness (K), damping (B), and equilibrium angle ($\theta_{eg}$) parameters, as shown in equation (4):

$$T_{joint}^{des} = K \cdot (\theta_{eq} - \theta_{joint}) - B \cdot \dot{\theta}_{joint} \tag{4}$$

The specific values of K, B, and $\theta_{eg}$ can be adjusted for each gait state to provide different levels of torque during different parts of the gait cycle. Example values are provided in Table 1 below.

To imitate the stiffening trend of the human ankle during walking while maintaining a continuous desired torque output, a piecewise equation can be used as shown in equation (5):

$$\begin{gathered} \Delta\theta = \theta_{joint} - \theta_{eq}^{0} \\ \text{if } (\Delta\theta < \Delta\theta_{ths}) \\ \{K = K1 \quad \theta_{eq} = \theta_{eq}^{0}\} \\ \text{else} \\ \left\{K = K2 \quad \theta_{eq} = -\left(\frac{K1}{K2}\right) \cdot \Delta\theta + \theta_{eq}^{0} + \Delta\theta\right\} \end{gathered} \tag{5}$$

In equation (5), K1 and K2 are different stiffness values, $\theta_{eq}^{0}$ is the desired equilibrium angle, and $\Delta\theta_{ths}$ is a deviation from the equilibrium angle. These parameters are used to switch the value of K in the impedance control equation such that the stiffness increases at large deviations from $\theta_{eq}^{0}$. Specifically, a value Δθ is calculated as the difference between the current ankle joint angle and $\theta_{eq}^{0}$. When Δθ is less than $\Delta\theta_{ths}$, the stiffness coefficient, K, is set to K1 and $\theta_{eq}$ is the same as the provided value for $\theta_{eq}^{0}$. When Δθ becomes greater than $\Delta\theta_{ths}$ the stiffness coefficient, K, is changed from K1 to K2, increasing the stiffness of the ankle exoskeleton. At the transition between states in the piecewise function, a new $\theta_{eq}$ is calculated to prevent a jump in the commanded torque. This function is designed to increase stiffness during the stance phase when the user is applying a significant torque to the exoskeleton, and thus creating a large deviation from the equilibrium point.

TABLE 1

Example Variable Stiffness Impedance Controller Parameters

| | Roll (0) | Push (1) | Swing (2) |
|---|---|---|---|
| K1 [Nm $deg^{-1}$] | 1 | 0.5 | 0.6 |
| K2 [Nm $deg^{-1}$] | 3 | 2 | 0.6 |
| $\theta_{eq}{}^{0}$ [deg] | 2 | −100 | 0 |
| $\Delta\theta_{ths}$ [deg] | 3 | 2 | 1 |
| B [Nm $deg^{-1}$ $s^{-1}$] | 0.01 | 0.02 | 0.02 |

The controller disclosed herein can include one or more processors and computer-readable media such as computer memory stored on one or more hardware storage devices. The computer memory may store computer-executable instructions that when executed by one or more processors cause various functions to be performed, such as the acts recited herein. The term controller may also be referred to herein as "computer" or "computer system."

Computer-readable media can include any media that can be accessed by the controller. Physical computer-readable storage media includes RAM, ROM, EEPROM, optical or magnetic storage devices, or any other medium which can be used to store desired program code means in the form of computer-executable instructions or data structures and which can be accessed by a controller.

Controller functionality can additionally or alternatively be carried out by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

The controller may be interconnected to one or more other computing systems via one or more network connections. Network connections may include, but are not limited to, connections via wired or wireless Ethernet, cellular connections, or even computer to computer connections through serial, parallel, USB, or other connections. The controller may be included in a distributed system environment in which local and remote computer systems, which are linked (either by hardwired data links, wireless data links, or by a combination of hardwired and wireless data links) through a network, both perform tasks. In a distributed system environment, program modules may be located in both local and remote memory storage devices.

Example Embodiments

The following clauses represent a non-limiting list of example embodiments and features.

Clause 1. A powered ankle exoskeleton, comprising: a frame configured to be worn adjacent a lower leg of a user; a power transmission assembly integrated with the frame and configured to deliver torque to a crank member to rotate the crank member about an ankle joint; and a foot/shoe interface coupled to the crank member and configured to interface with a foot or shoe of the user and to transmit torque generated at the ankle joint to the foot or shoe of the user, wherein the power transmission assembly comprises a slider-crank configuration with series-elastic actuation.

Clause 2. The powered ankle exoskeleton of clause 1, wherein the power transmission assembly comprises an offset slider-crank four-bar linkage kinematic configuration with series-elastic actuation.

Clause 3. The powered ankle exoskeleton of any preceding clause, wherein the power transmission assembly comprises: a motor; a power screw mechanically coupled to the motor, wherein the motor drives rotation of a shaft of the power screw which drives linear motion of a nut assembly of the power screw, wherein the linear motion of the nut assembly defines a linear axis; a spring comprising a first end and a second end, wherein the first end is coupled to the nut assembly and wherein the spring is configured to transmit forces along the linear axis; and an end-effector coupled to the second end of the spring, wherein the end-effector is configured to move along the linear axis to drive rotation of the crank member via a coupler.

Clause 4. The powered ankle exoskeleton of clause 3, wherein the coupler includes a first end coupled to the end-effector via a revolute joint and a second end coupled to an arm of the crank member via a revolute joint, wherein the coupler translates linear motion of the end-effector to rotation of the crank member about the ankle joint.

Clause 5. The powered ankle exoskeleton of clause 3 or 4, wherein the power screw is configured as a ball screw.

Clause 6. The powered ankle exoskeleton of any of clauses 3-5, wherein the spring is the only spring in the power transmission assembly and is configured to provide both tension and compression along the linear axis.

Clause 7. The powered ankle exoskeleton of any of clauses 3-6, wherein the nut assembly and the end-effector are slidably connected to a guide rail, wherein the guide rail is configured to maintain movement of the nut assembly and end-effector along the linear axis.

Clause 8. The powered ankle exoskeleton of any of clauses 3-7, wherein the nut assembly comprises a connector portion to couple to the first end of the spring, wherein the connector portion includes threads that match a pitch and diameter of the spring, and wherein the first end of the spring is threaded thereon.

Clause 9. The powered ankle exoskeleton of any of clauses 3-8, wherein the end-effector comprises a connector portion to couple to the second end of the spring, wherein the connector portion includes threads that match a pitch and diameter of the spring, wherein the second end of the spring is threaded thereon.

Clause 10. The powered ankle exoskeleton of any of clauses 3-9, further comprising a spring deflection sensor in the form of a linear potentiometer positioned with potentiometer and shaft of the potentiometer on opposite sides of the spring.

Clause 11. The powered ankle exoskeleton of any preceding clause, wherein the foot/shoe interface comprises one or more passive degrees of freedom to enable movement of a foot/shoe of the user relative to the ankle joint.

Clause 12. The powered ankle exoskeleton of clause 11, wherein the foot/shoe interface comprises (1) a first passive degree of freedom that enables abduction and adduction of the foot/shoe and/or (2) a second passive degree of freedom that enables eversion and inversion of the foot/shoe.

Clause 13. The powered ankle exoskeleton of any preceding clause, wherein the frame is configured to be positioned on a medial or lateral side of the lower leg.

Clause 14. The powered ankle exoskeleton of clause 13, further comprising a shin cuff configured to be positioned on an anterior or posterior side of the lower leg, wherein the shin cuff is coupled to the frame via a link member, and wherein the shin cuff and link member provide one or more passive degrees of freedom to enable movement of the frame relative to the shin cuff.

Clause 15. The powered ankle exoskeleton of clause 14, wherein the link member includes a first end connected to the shin cuff via a revolute connection and a second end connected to the frame via a revolute connection such that the link member enables relative movement of the frame and the shin cuff about axes parallel to an anterior/posterior direction.

Clause 16. The powered ankle exoskeleton of clause 14 or 15, wherein the link member is coupled to the shin cuff via a joint that is (1) configured as a prismatic joint that enables relative vertical movement of the frame and the shin cuff, wherein the prismatic joint is optionally biased toward a default position, and/or (2) configured to enable relative rotation of the frame and the shin cuff along an axis parallel to a medial/lateral direction.

Clause 17. The powered ankle exoskeleton of any preceding clause, wherein the foot/shoe interface is configured to interface with a heel portion of a user's foot/shoe.

Clause 18. The powered ankle exoskeleton of any preceding clause, further comprising a controller that is configured to: measure position and velocity of the ankle joint to determine a desired torque at the ankle joint; determine a measured torque at the ankle joint based on a determined spring force and based on current ankle joint position; and using the desired torque and the measured torque, determine a command torque; and send the command torque to the motor.

Clause 19. The powered ankle exoskeleton of clause 18, wherein the controller is further configured to determine a gait state based on the measured position and velocity of the ankle joint, wherein the desired torque is determined according to the determined gait state.

Clause 20. The powered ankle exoskeleton of any preceding clause, wherein the powered ankle exoskeleton has a mass of 1.3 kg or less.

Additional Terms & Definitions

Certain features are described herein in terms of anatomical directions relative to a user wearing the exoskeleton, such as an anterior/posterior direction and a medial/lateral direction. It will be understood that such directional relationships need not be exactly parallel to their anatomical counterparts, and tolerances are included to account for anatomical differences between users, shifting of the exoskeleton position during use, and the like.

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

The various features of a given embodiment can be combined with and/or incorporated into other embodiments disclosed herein. Thus, disclosure of certain features relative to a specific embodiment of the present disclosure should not be construed as limiting application or inclusion of said features to the specific embodiment. Rather, it will be appreciated that other embodiments can also include such features.

In addition, unless otherwise indicated, numbers expressing quantities, constituents, distances, or other measurements used in the specification and claims are to be understood as optionally being modified by the term "about." When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

The embodiments disclosed herein should be understood as comprising/including disclosed components, and may therefore include additional components not specifically described. Optionally, the embodiments disclosed herein are essentially free or completely free of components that are not specifically described. That is, non-disclosed components may optionally be completely omitted or essentially omitted from the disclosed embodiments. For example, power transmission assembly components that are not specifically disclosed herein may optionally be omitted.

The invention claimed is:

1. A powered ankle exoskeleton, comprising:
- a frame configured to be worn adjacent a lower leg of a user;
- a power transmission assembly integrated with the frame and configured to deliver torque to a crank member to rotate the crank member about an ankle joint;
- a foot/shoe interface coupled to the crank member and configured to interface with a foot or shoe of the user and to transmit torque generated at the ankle joint to the foot or shoe of the user; and
- a shin cuff coupled to the frame via a link member configured to enable the shin cuff to pivot relative to the frame,
- wherein the link member is coupled to the shin cuff via a prismatic joint that enables relative vertical movement of the frame and the shin cuff,
- wherein the prismatic joint is biased toward a default position to thereby bias the link member toward rotation that brings the frame and shin cuff closer together in the absence of a counteracting force,
- wherein the power transmission assembly comprises
  - a motor,
  - a power screw mechanically coupled to the motor, wherein motor operation drives rotation of a shaft of the power screw to drive linear motion of a nut assembly of the power screw, wherein the linear motion of the nut assembly defines a linear axis, and
  - a spring comprising a first end and a second end, wherein the first end is coupled to the nut assembly and wherein the spring is configured to transmit forces along the linear axis; and
  - an end-effector coupled to the second end of the spring, wherein the end-effector is configured to move along the linear axis to drive rotation of the crank member via a coupler.

2. The powered ankle exoskeleton of claim 1, wherein the power transmission assembly comprises an offset slider-crank four-bar linkage kinematic configuration with series-elastic actuation.

3. The powered ankle exoskeleton of claim 1, wherein the coupler includes a first end coupled to the end-effector via a revolute joint and a second end coupled to an arm of the crank member via a revolute joint, wherein the coupler translates linear motion of the end-effector to rotation of the crank member about the ankle joint.

4. The powered ankle exoskeleton of claim 1, wherein the power screw is configured as a ball screw.

5. The powered ankle exoskeleton of claim 1, wherein the spring is the only spring in the power transmission assembly and is configured to provide both tension and compression along the linear axis.

6. The powered ankle exoskeleton of claim 1, wherein the nut assembly and the end-effector are slidably connected to a guide rail, wherein the guide rail is configured to maintain movement of the nut assembly and end-effector along the linear axis.

7. The powered ankle exoskeleton of claim 1, wherein the nut assembly comprises a connector portion to couple to the first end of the spring, wherein the connector portion includes threads that match a pitch and diameter of the spring, and wherein the first end of the spring is threaded thereon.

8. The powered ankle exoskeleton of claim 1, wherein the end-effector comprises a connector portion to couple to the second end of the spring, wherein the connector portion includes threads that match a pitch and diameter of the spring, wherein the second end of the spring is threaded thereon.

9. The powered ankle exoskeleton of claim 1, further comprising a spring deflection sensor in the form of a linear potentiometer positioned with potentiometer and shaft of the potentiometer on opposite sides of the spring.

10. The powered ankle exoskeleton of claim 1, wherein the link member includes a first end connected to the shin cuff via a revolute connection rotatable about an anterior/posterior direction and a second end connected to the frame via a revolute connection also rotatable about an anterior/posterior direction, wherein the revolute connections of the link member enable the shin cuff to pivot relative to the frame.

11. The powered ankle exoskeleton of claim 1, wherein the foot/shoe interface is configured to interface with a heel portion of a user's foot/shoe.

12. The powered ankle exoskeleton of claim 1, wherein the joint coupling the link member and shin cuff is further configured to enable relative rotation of the frame and the shin cuff along an axis parallel to a medial/lateral direction.

13. The powered ankle exoskeleton of claim 1, wherein the foot/shoe interface comprises one or more passive degrees of freedom to enable movement of a foot/shoe of the user relative to the ankle joint.

14. The powered ankle exoskeleton of claim 13, wherein the foot/shoe interface comprises (1) a first passive degree of freedom that enables abduction and adduction of the foot/shoe and/or (2) a second passive degree of freedom that enables eversion and inversion of the foot/shoe.

15. The powered ankle exoskeleton of claim 1, wherein the frame is configured to be positioned on a medial or lateral side of the lower leg.

16. The powered ankle exoskeleton of claim 15, wherein the shin cuff is configured to be positioned on an anterior or posterior side of the lower leg.

17. A powered ankle exoskeleton, comprising:

a frame configured to be positioned on a medial or lateral side of a user's lower leg;

a power transmission assembly integrated with the frame and configured to deliver torque to a crank member to rotate the crank member about an ankle joint;

a foot/shoe interface coupled to the crank member and configured to interface with a foot or shoe of the user and to transmit torque generated at the ankle joint to the foot or shoe of the user; and a shin cuff configured to be positioned on an anterior or posterior side of the lower leg, wherein the shin cuff is coupled to the frame via a link member, and wherein the shin cuff and link member provide one or more passive degrees of freedom to enable movement of the frame relative to the shin cuff, wherein the link member includes a first end connected to the shin cuff via a revolute connection rotatable about an anterior/posterior direction and a second end connected to the frame via a revolute connection also rotatable about an anterior/posterior direction, wherein the revolute connections of the link member enable the shin cuff to pivot toward and away from the frame, wherein the link member is coupled to the shin cuff via a joint that is configured as (i) a prismatic joint that enables relative vertical movement of the frame and the shin cuff, and (ii) as a revolute joint that enables relative rotation of the frame and the shin cuff along an axis parallel to a medial/lateral direction, wherein the prismatic joint is biased toward a default position to thereby bias the link member toward rotation that brings the frame and shin cuff closer together in the absence of a counteracting force.

18. The powered ankle exoskeleton of claim 17, wherein the power transmission assembly comprises a slider-crank configuration with series-elastic actuation.

19. A powered ankle exoskeleton, comprising:

a frame configured to be positioned on a medial or lateral side of a user's lower leg;

a power transmission assembly integrated with the frame and configured to deliver torque to a crank member to rotate the crank member about an ankle joint;

a foot/shoe interface coupled to the crank member and configured to interface with a foot or shoe of the user and to transmit torque generated at the ankle joint to the foot or shoe of the user; and a shin cuff configured to be positioned on an anterior or posterior side of the lower leg, wherein the shin cuff is coupled to the frame via a link member that includes a first end connected to the shin cuff and a second end connected to the frame, the link member configured to enable the shin cuff to pivot relative to the frame, wherein the first end of the link member is coupled to the shin cuff via a prismatic joint that enables relative vertical movement of the frame and the shin cuff, wherein the prismatic joint is biased toward a default position to thereby bias the link member toward rotation that brings the frame and shin cuff closer together in the absence of a counteracting force.

20. The powered ankle exoskeleton of claim 19, wherein the prismatic joint comprises one or more springs that bias the first end of the link member in a direction that rotates the link member toward the frame and thereby brings the shin cuff closer to the frame in the absence of a counteracting force.

* * * * *